(12) United States Patent
Blum et al.

(10) Patent No.: US 6,182,141 B1
(45) Date of Patent: *Jan. 30, 2001

(54) TRANSPARENT PROXY SERVER

(75) Inventors: Scott B. Blum, Beaverton; Jonathan Lueker, Portland, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/770,918

(22) Filed: Dec. 20, 1996

(51) Int. Cl.$^7$ .................................................. G06F 15/16
(52) U.S. Cl. ......................... 709/227; 709/230; 709/328
(58) Field of Search ...................... 395/187.01, 188.01, 395/200.55, 200.59, 200.47, 200.49, 684; 370/401; 709/227, 225, 229, 217, 218, 219, 230, 300, 302; 713/201

(56) References Cited

U.S. PATENT DOCUMENTS

| | | | |
|---|---|---|---|
| 5,218,699 | * 6/1993 | Brandle et al. ...................... 395/684 |
| 5,604,896 | * 2/1997 | Duxbury et al. ................. 709/227 X |
| 5,623,601 | * 4/1997 | Vu .................................... 395/187.01 |
| 5,699,513 | * 12/1997 | Feigen et al. ......................... 713/201 |
| 5,781,550 | * 7/1998 | Templin et al. ...................... 370/401 |
| 5,826,014 | * 10/1998 | Coley et al. ..................... 395/187.01 |
| 5,987,517 | * 11/1999 | Firth et al. ........................... 709/230 |

OTHER PUBLICATIONS

Rolf Oppliger, Internet security enters the Middle Ages, Oct. 1995, pp. 100–101, IEEE.*
Steven Bellovin et al., Network Firewalls, Sep. 1994, pp. 50–57, IEEE Communications Magazine.*

* cited by examiner

*Primary Examiner*—Zarni Maung
*Assistant Examiner*—Patrice Winder
(74) *Attorney, Agent, or Firm*—Cynthia T. Faatz

(57) ABSTRACT

A transparent proxy. In a computer system, a layered service provider intercepts a communications request from a client application in the native protocol of the communications request wherein the communications request requests communication with a remote server. The service provider bundles and passes the communications request to a predetermined port. A transparent proxy application listening on the predetermined port receives the communications request in the native protocol of the request and establishes the requested communication.

25 Claims, 5 Drawing Sheets

TRANSPARENT PROXY SERVER

BACKGROUND OF THE INVENTION

1. Field of the Invention

The present invention relates to the field of network computing and more particularly to a transparent proxy server.

2. Description of Related Art

A proxy server, also referred to simply as a proxy, is an application that provides access to the Internet or other external network for a single or small number of host computer systems while appearing to provide Internet access for a larger number of computer systems. Current proxy technologies provide for multiple personal computers (PCs) connected via a local area network (LAN) to access a single Internet Service Provider (ISP) account, for example.

The proxy server receives requests from client application programs hosted on a computer system on the LAN to communicate with remote servers external to the LAN. The proxy server evaluates these requests and determines which of the communications requests to pass on to the Internet or other external network where the indicated remote server(s) are located. If a communications request is approved, the proxy server communicates with the remote server on behalf of the client application. The proxy server does so by relaying requests from the client application to the remote server and returning responses from the remote server back to the client application. In this manner, the proxy server provides the illusion that the client program is communicating directly with the remote server.

Existing proxy servers require each client application program, such as an Internet browser program for example, to be configured to recognize and use the proxy server. Specifically, client programs need to know how to contact the proxy server with a communications request, and how to format the communications request in order to correctly identify the remote server with which communication is requested. Client programs which do not include proxy configuration capabilities may not make use of current proxy servers.

Currently available proxy servers have another issue in that specific code must be included in the proxy server to recognize and interpret each protocol that may be used by a client program. Commonly used protocols include Hypertext Transfer Protocol (HTTP), File Transfer Protocol (FTP), Telnet, and Secure Sockets Layer (SSL), for example. However, new protocols and revisions of existing protocols are frequently introduced. Thus, there may be an issue if a protocol used by a particular client program is not supported by the proxy server. In order to support a new or revised protocol, a new revision of the proxy server is developed and released. Adding to and/or revising proxy code requires a significant amount of time and effort such that proxy support for a new protocol may lag introduction of the protocol by several months or longer.

Further compounding the issue, when a currently available proxy server is used, protocols do not run in native mode when the client program has been configured for proxy mode. If the client program is a browser for example, with the browser in proxy mode, a request such as an FTP request is encapsulated within HTTP by an encapsulation routine before reaching the proxy server. The proxy server must then strip the FTP request from the HTTP encapsulation before making a connection over the Internet in native FTP mode. Similarly, all responses received from the remote server will be in native FTP, but the proxy server must then format the response into a HyperText Markup Language (HTML) page and send it back to the client program encapsulated within the HTTP protocol. Stripping incoming encapsulated requests received from the client application program and reformatting responses received from the Internet server requires significant overhead. Even client programs which do not directly encapsulate the protocol of the request within another protocol may still alter the protocol, such that it is different from the native protocol and does not run well for non-proxied purposes.

What is needed is a proxy server application which does not require client programs to run in proxy mode such that client programs which do not include proxy configuration capabilities may use the proxy server. Further, what is needed is a proxy server application which does not require additional code or significant code revisions in order to support new or revised protocols, and which is transparent to the client application for local communications requests such that non-proxied requests are handled transparently even in the presence of the proxy server application.

SUMMARY OF THE INVENTION

A method and apparatus for providing transparent proxy services is described. A layered service provider intercepts a communications request from a client application in the native protocol of the communications request. If the communications request requests communication with a remote server, the layered service provider packages and forwards the communications request to a predetermined well-known port. A transparent proxy application listening on the predetermined well-known port receives the communications request in the native protocol of the request and establishes communication with the remote server, such that communication between the client application and the remote server is tunneled bi-directionally through the transparent proxy.

BRIEF DESCRIPTION OF THE DRAWINGS

The invention will be understood more fully from the detailed description given below and from the accompanying drawings of embodiments of the invention, which, however, should not be taken to limit the invention to the specific embodiments, but are for explanation and understanding only.

DETAILED DESCRIPTION

The present invention relates to a method and apparatus for providing transparent proxy services. In the following description, numerous specific details such as specific software modules, computer system configurations, and protocols are set forth in order to provide a thorough understanding of the invention. However, it will be appreciated by those skilled in the art that the invention may be practiced without these specific details. In other instances, well-known structures, interfaces, software modules, software programs, and processes have not been described in detail in order to avoid obscuring the invention.

Figure 1:
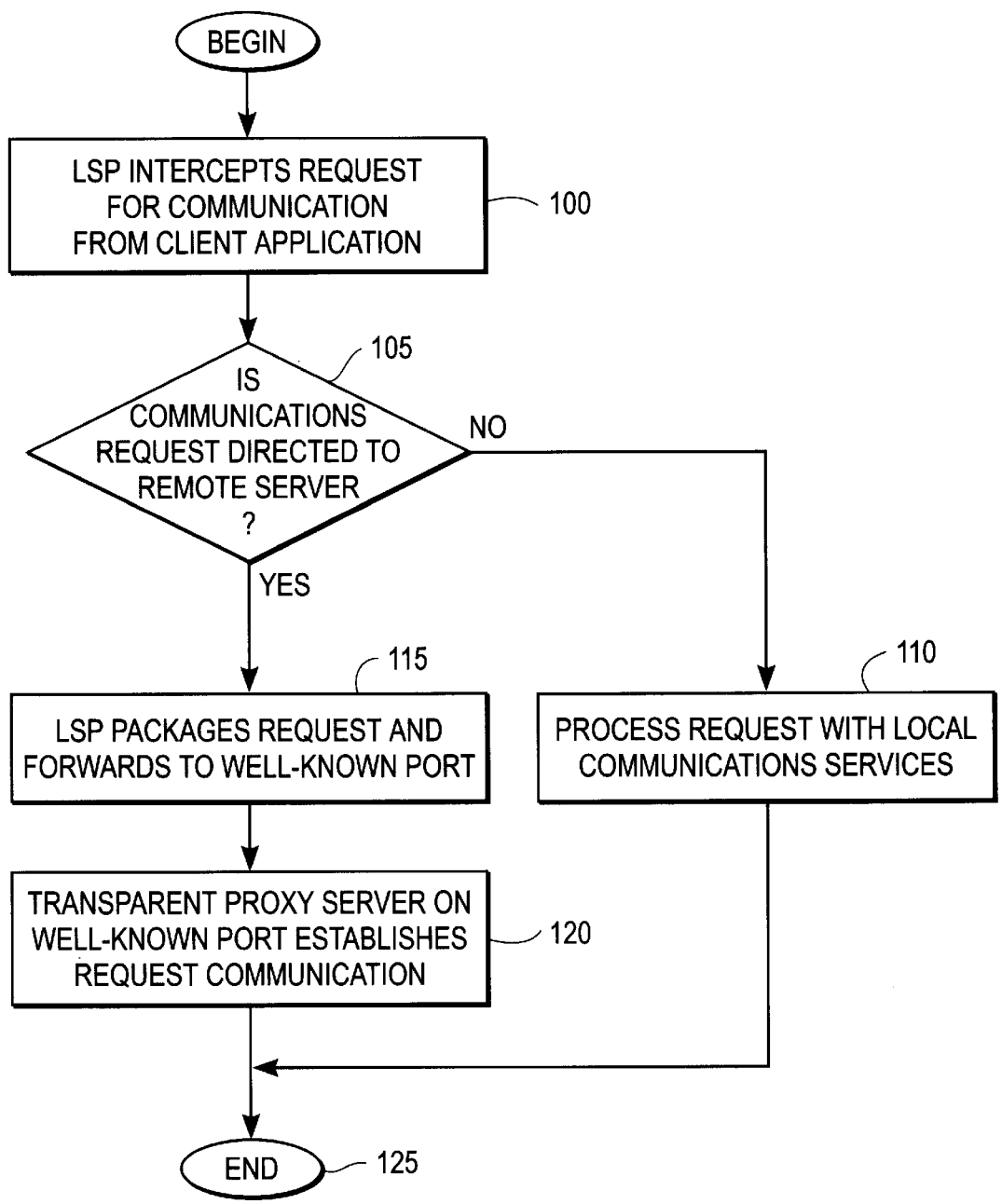
FIG. 1 is a flow diagram illustrating the method of one embodiment of the invention.

FIG. 1 is a flow diagram illustrating one embodiment of the invention. In step 100, a layered service provider (LSP) of the invention intercepts a communications request from a client application. The term "layered service provider" as used in this context refers to a software module which provides a service such as application programming interface (API) tunneling or name space services, for example. The service provider is layered such that communications requests directed to local PCs are passed through by the LSP to underlying services such that local requests can be processed using local services in a manner transparent to the client.

A request for communication or communications request as the terms are used herein may be a connection request directed to a particular server, either local or remote, as identified by a server name or Internet Protocol (IP) address, or the communications request may be an address resolution request such as a Domain Name Services (DNS) request to determine an IP address from a given server name provided in a Uniform Resource Locator (URL) for example. An IP address, as is well-known to those of skill in the art uniquely identifies a server or subnetwork on the Internet. An IP address along with a port number uniquely identifies a process on a particular server on the Internet.

In step 105, the LSP determines whether the communications request is directed to a remote server or to a server on the local area network (LAN) to which a computer system hosting the client application is connected. This step may be performed by checking the IP address of the server indicated in the communications request. If the communications request is not directed to a remote server, but to a local PC, then in step 110, the communications request is processed by local communications services on the computer system hosting the client application.

After determining that the communications request is directed to a remote server, i.e. a server not on the same LAN as the client application, then in step 115, the LSP of the invention packages the communications request and forwards the request to a predetermined well-known port on which a transparent proxy server application listens. To package in this context means to add information to the communications request required to forward the request to the proxy server through the various software layers. The LSP of the invention directs communications requests from client applications to the transparent proxy such that the client programs themselves do not need to be configured to know about the transparent proxy in order to use the transparent proxy. In this manner, the client application program is not required to include proxy mode configuration capabilities, and the request for communication remains in its native protocol without being encapsulated or otherwise altered.

Well-known ports are soft ports associated with particular applications and Internet protocols, and are registered with the Internet Assigned Numbers Authority (IANA). The particular well-known port for the transparent proxy server of the invention is not available at the time of this application, but will be registered with the IANA. Further, the particular well-known port is not critical to the operation of the invention as long as all remote communications requests are forwarded to the transparent proxy on a particular port which is not used for other purposes.

In step 120, the transparent proxy server listening on the predetermined well-known port establishes the requested communication between the client application program and the remote server indicated in the communications request. The method ends at step 125.

Figure 2:
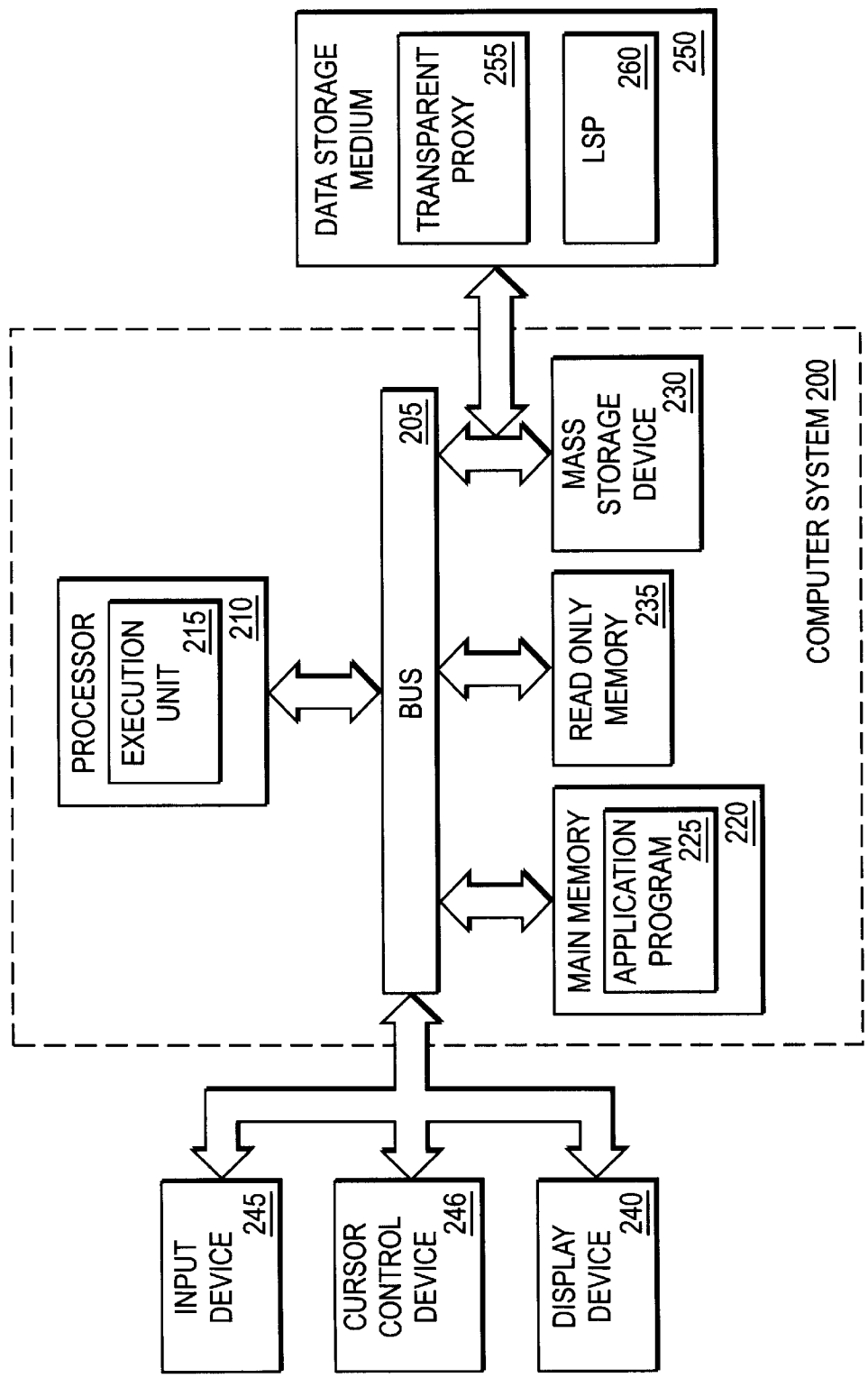
FIG. 2 is a block diagram illustrating a computer system in which the present invention may be advantageously utilized.

One embodiment of the invention is implemented through a set of software modules which may be executed on a computer system such as the computer system 200 illustrated in FIG. 2. In general, such computer systems as illustrated by FIG. 2 comprise a bus 205 for communicating information, a processor 210 including an execution unit 215 coupled to the bus 205 for processing information, a main memory 220 coupled to the bus 205 for storing information and instructions for the processor. For example, the main memory 220 may store an application program 225 which may be transferred to the main memory 220 from another memory such as a mass storage device 230 also coupled to the bus 205. The computer system 200 also includes a read-only memory (ROM) 235 coupled to the bus 205 for storing fixed information and instructions for the processor 210, a display device 240 coupled to the bus 205 for displaying information to the computer system user, and an input device 245 and/or cursor control device 246 coupled to the bus 205 for communicating information and command selections to the processor 210.

The mass storage device 230 is coupled to the bus 205 for storing information and instructions for use by the processor 210. A data storage medium 250 containing digital information is configured to operate with the mass storage device 230 to allow the processor 210 access to the digital information on the data storage medium 250 via the bus 205. The mass storage device 230 may be a conventional hard disk drive, floppy disk drive, compact disc read only memory (CD ROM) drive, or other magnetic or optical data storage device for reading and writing information stored on the data storage medium 250 which may be a hard disk, a floppy disk, a CD ROM, a magnetic tape, or other magnetic or optical data storage medium. The data storage medium is capable of storing sequences of instructions which cause the computer system 200 to perform specific functions.

The transparent proxy application 255 and layered service providers 260 of the invention, as well as other software modules, may be stored on the data storage medium 250 and subsequently loaded into and executed within the computer system 200 using well-known techniques. It will be appreciated by those of skill in the art that, although the transparent proxy application 255 and the LSPs 260 are shown as being stored on the data storage medium 260, they may be stored in any memory of the computer system 200 including the main memory 220.

Figure 3:
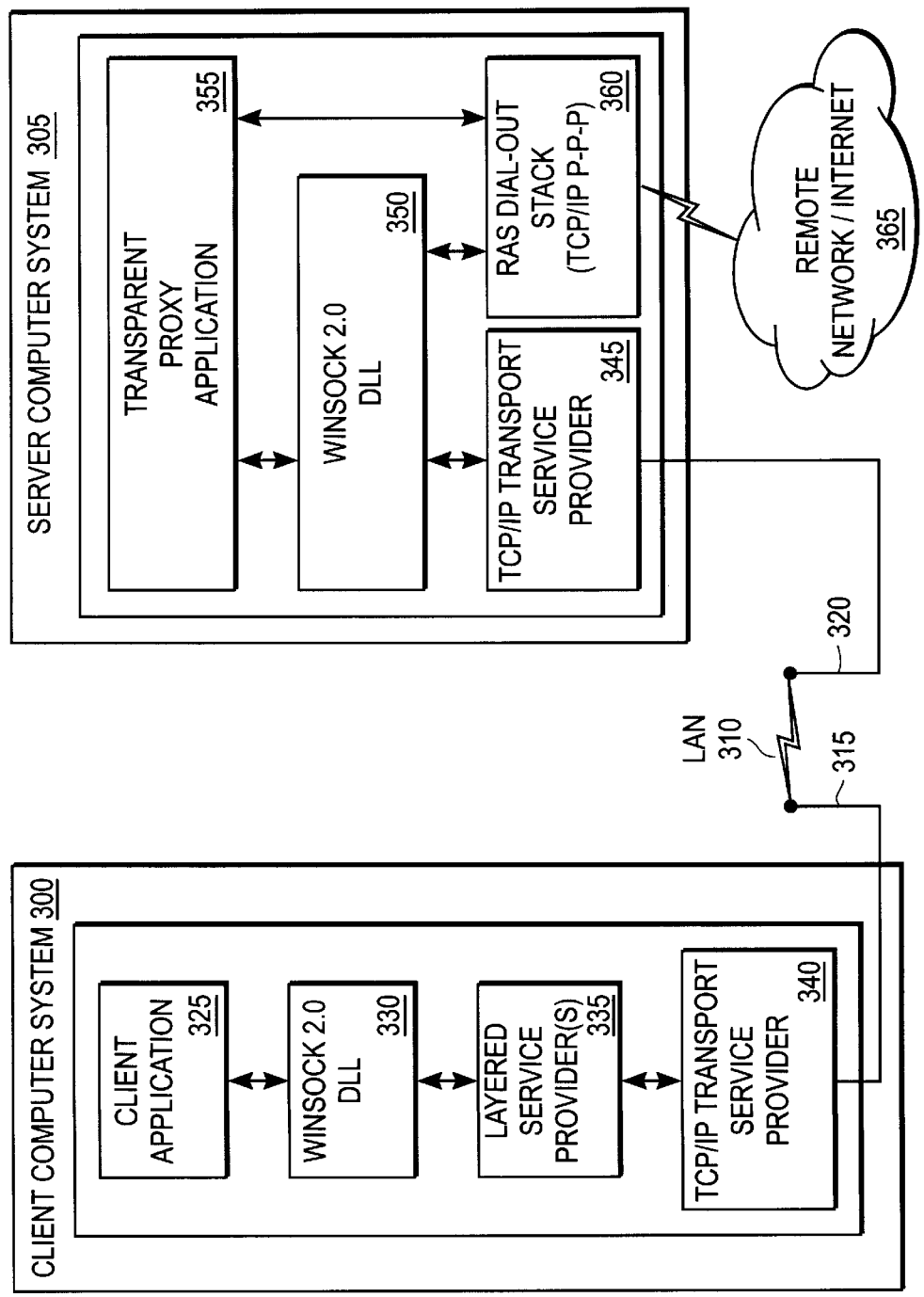
FIG. 3 illustrates an overview of a client-server environment utilizing the transparent proxy of one embodiment of the invention.

FIG. 3 illustrates a client - server environment and an overview of the software modules which operate with, and are used to implement the transparent proxy of one embodiment of the invention. In this example, a client computer system 300 is coupled to a server computer system 305 over a radio frequency (RF) LAN 310. Network connection devices 315 and 320, which are RF antennae in this embodiment, are provided on the client computer system 300 and the server computer system 305, respectively to enable the LAN connection.

The client system 300 includes a client application program 325 which is capable of communicating with a remote network. In this example, the application program is a TCP/IP-compatible client application such as Netscape's Navigator® browser, for example (Navigator is a registered trademark of Netscape Corporation). In accordance with one embodiment, each of the client and server computer systems 300 and 305 also includes a Windows® 95 or Windows NT® operating system (not shown) from Microsoft Corporation and has a Winsock 2.0 TCP/IP stack installed, some of the components of which are described below (Windows and Windows NT are registered trademarks of Microsoft Corporation).

The client system 300 includes Winsock 2.0 Dynamic Link Libraries (DLLs) 330 which are part of the Winsock 2.0 TCP/IP stack. Winsock is an Application Programming Interface (API) cooperatively developed by various industry contributors. The Winsock API and associated dynamic link libraries (DLLs) contain the information and procedures that a Windows operating system uses to interface with the Transmission Control Protocol/Internet Protocol (TCP/IP) or another supported transport protocol. Winsock 2.0 is the latest version of the Winsock API and/or DLLs at the time of invention, but future versions of Winsock may also be used in accordance with the invention.

The client system 300 includes layered service providers (LSPs) 335 which operate to intercept communications requests from the TCP/IP-compatible client application 325 which are directed to computer systems other than those directly coupled to the LAN 310. The LSPs 335 are modules which are added to the Winsock 2.0 TCP/IP stack in one embodiment in order to direct communications requests bound for remote servers to the transparent proxy application on the predetermined well-known port. A TCP/IP transport service provider 340 is also provided on the client computer system 300, and in this example, operates to provide reliable data transport between the client computer system 300 and the server computer system 305 or other computer systems over the LAN 310.

The server computer system 305 also includes a TCP/IP transport service provider 345 and Winsock 2.0 DLLs 350 which operate in the same manner and perform the same functions for the server system 305 as the identically named components on the client computer system 300. The server computer system 305 also includes the transparent proxy application 355 of the invention which provides proxy services without requiring client programs to be specially configured to know about and use the proxy 355.

The server computer system 305 also includes a remote access service (RAS) dial-out stack 360 utilizing the TCP/IP point-to-point protocol (P-P-P) in this example. The RAS dial-out stack 360 provides the capability to establish remote connections to external networks 365 such as a wide area network (WAN), the Internet, or the World Wide Web (WWW) which is hosted on the Internet. The terms remote network and external network are used interchangeably herein to refer to any network with which the server 305 is capable of communicating other than the LAN 310.

Figure 4:
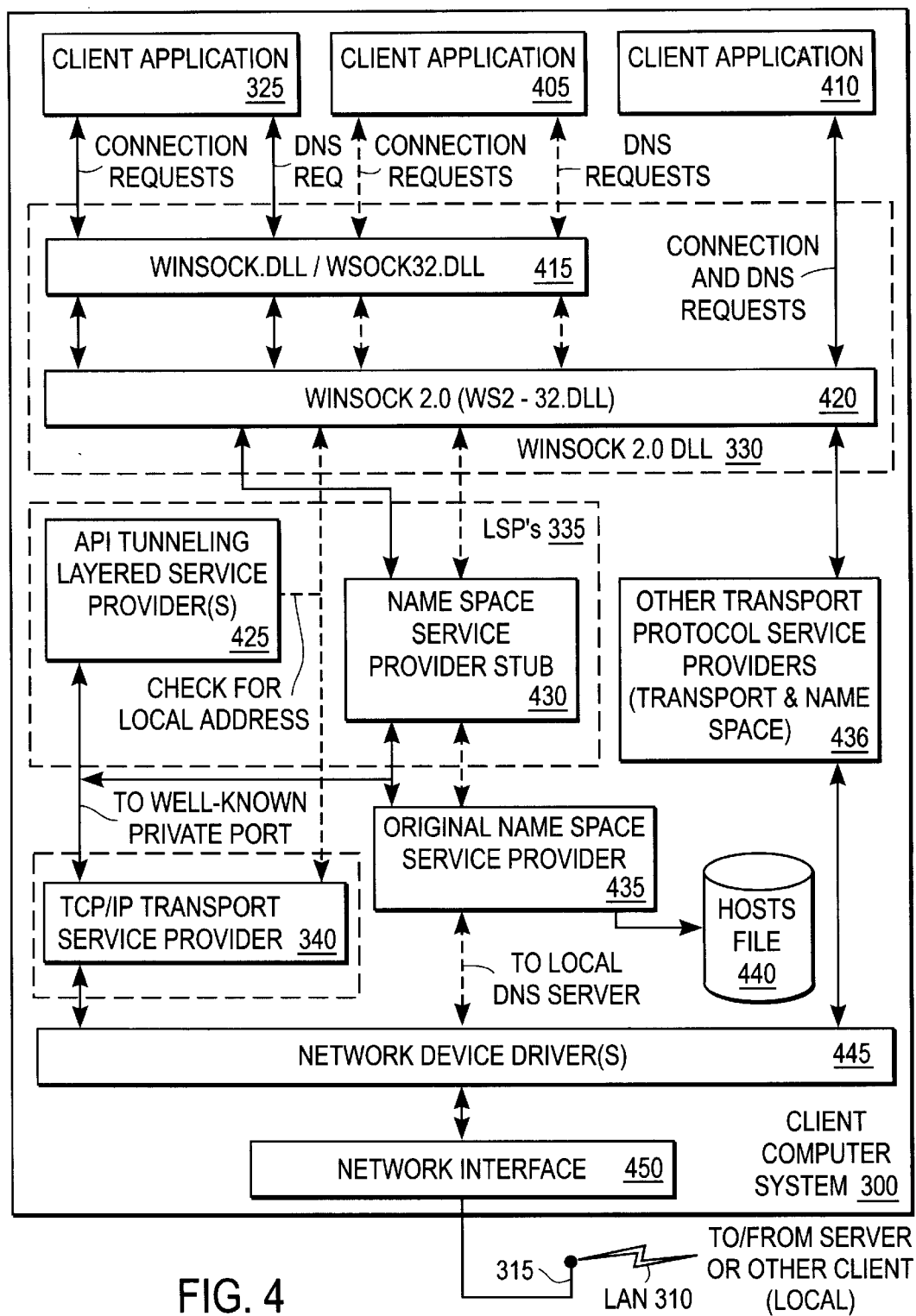
FIG. 4 illustrates in additional detail the software modules on a client computer system in accordance with one embodiment of the invention.

FIG. 4 illustrates in additional detail the software modules which are stored on and utilized by the client computer system 300 in accordance with one embodiment of the invention. Along with the TCP/IP-compatible client application 325, other client programs such as the local client application (a TCP/IP-compatible application in this example) 405 which communicates only with other computer systems on the LAN 310, and the client application 410 may also be stored on and utilized by the client computer system 300. In this example, the client application 410 is compatible with a transport protocol other than TCP/IP such as IPX/SPX from Novell Corporation, Network Basic Input/Output System (NetBIOS) and/or NetBIOS Extended User Interface (NetBEUI) protocols.

The Winsock 2.0 WINSOCK/WSOCK 32 DLLs 330 include DLLs 415 which provide Winsock functionality and backward compatibility for programs written to use previous versions of Winsock. Also included in the Winsock 2.0 DLLs 330 are DLLs 420 which include new capabilities supported by Winsock 2.0 including support for applications such as the application 410 to interface with other protocols such as IPX/SPX, NetBEUI and NetBIOS.

The LSPs 335 include an API tunneling layered service provider (LSP) 425 and a layered name space service provider (NSP) stub 430. The API tunneling LSP 425 provides API tunneling capabilities enabling communication between applications on the client computer system 300 and applications on remote networked computers through the transparent proxy of the invention. Communications requests which are not bound for remote servers are passed through to the TCP/IP transport service provider 340 such that the LSP 425 is transparent to the applications on the client computer system 300 for local communications requests.

It should be noted that upon initiating a communications request, a client application opens a socket. As is well-known in the art, a socket is an endpoint of communication which may be in a particular application on a particular computer system. Generally speaking, a socket is identified by an Internet Protocol (IP) address uniquely identifying a computer system or sub-network, and a port address identifying a particular location in the computer system or sub-net. Once a socket-to-socket connection is established between a client application and a service on a remote server, for example, communication is tunneled through this socket-to-socket connection until one or more of the sockets is closed. The API tunneling LSP 425 assists in establishing communication between the requesting client application and the transparent proxy application 355 such that a socket-to-socket connection can be established.

The NSP stub 430 of the invention enables communications between the client computer system 300 through the transparent proxy to remote DNS or other address resolution servers or services. The NSP stub 430 of one embodiment replaces the name space service provider (NSP) 435 which was originally installed on the client computer system as part of the Winsock 2.0 TCP/IP stack. The original client NSP 435 is then re-loaded under the NSP stub 430 such that the name space services are layered and a user of the client system 300 does not detect any change in local name space services. The NSP stub 430 is capable of intercepting DNS requests which require a remote connection and thus, need to be directed to the transparent proxy application, while the original client NSP 435 is not. The original NSP 435 is used for local address resolution requests which are passed through from the NSP stub 430 and handled by a hosts file 440 or a local DNS server, either of which may or may not be available in particular client computer systems. Other transport protocol service providers 436 are also included in one embodiment of the invention to direct communications requests from the client application 410 to use the transparent proxy in the same manner as described below in reference to TCP/IP transport layers for TCP/IP-compliant applications 325 and 405.

The hosts file 440 is a simple text file used to keep track of the network or IP addresses for each host on a local network such as the LAN 310. If a server name indicated in a particular request for communication from one of the client applications 325 or 405 is not stored in the hosts file 440, the client computer system 300 must turn to an address resolution service such as a DNS server to try to resolve the server name to an IP address.

The TCP/IP transport service provider 340 is also stored on the client computer system 300 along with at least one network device driver 445 which drives the network connector 315 and a network interface 450 which provides the interface between the client system 300 and the network connector 315. In one embodiment, the network device driver(s) 445 are in accordance with the Network Device Interface Specification (NDIS) although other types of network device drivers using different interface specifications are also within the scope of the invention.

Figure 5:
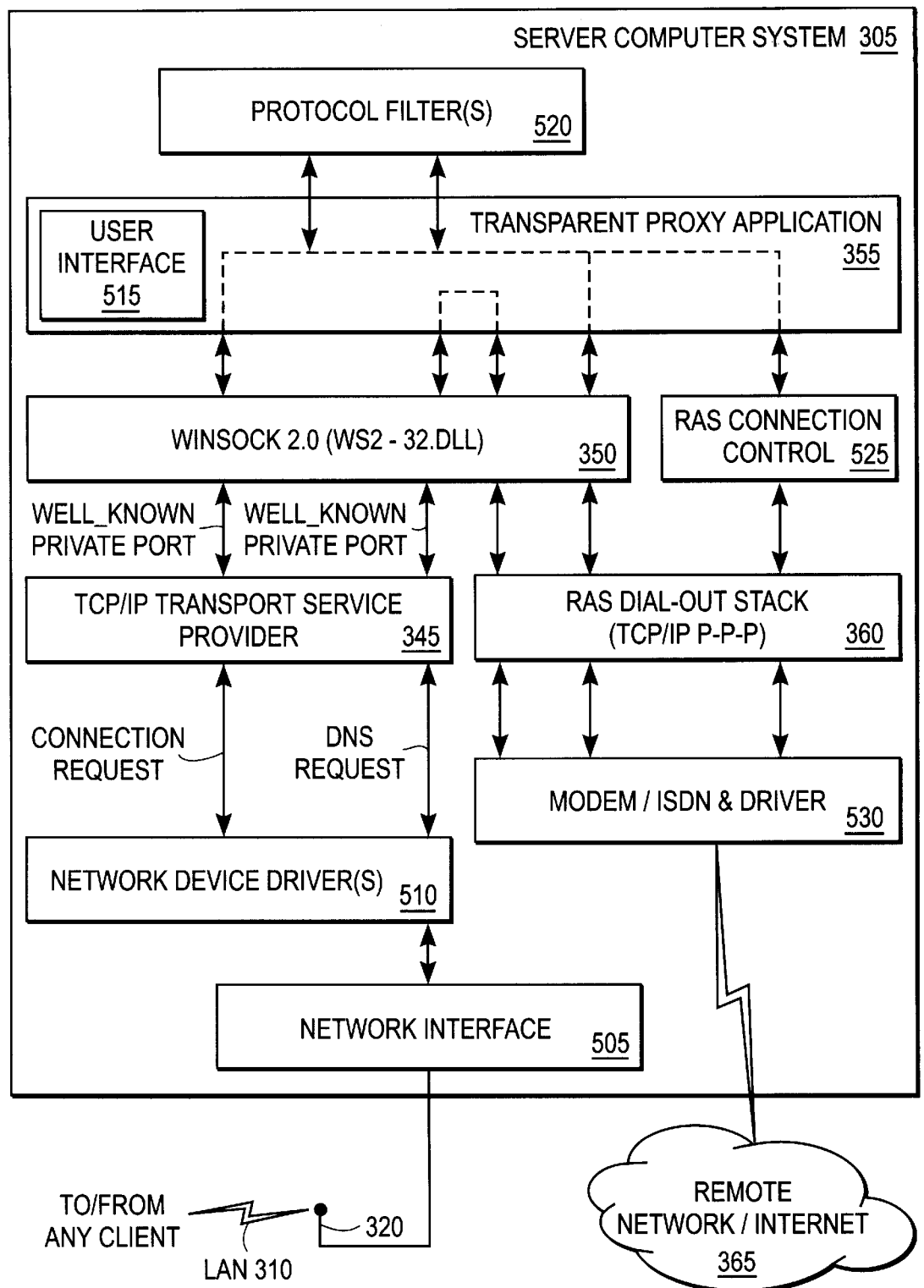
FIG. 5 illustrates in additional detail software modules on a server computer system in accordance with one embodiment of the invention.

FIG. 5 illustrates in additional detail the software modules which are stored in a memory and utilized by the server 305 in responding to remote communications requests from the client system 300. Communications requests are received from the client system 300 over the LAN 310 by the network connector 320 through the server network interface 505. The server network connector 320 is driven by the network device driver(s) 510 which are NDIS driver(s) in one embodiment. As described in reference to the client-server environment of FIG. 3, the server 305 stores and utilizes the TCP/IP transport service provider 345, the Winsock 2.0 DLLs 350 and the transparent proxy application 355.

The transparent proxy application 355 includes a user interface 515 which provides for connection control. In one embodiment, for example, a computer system user may configure the transparent proxy 355 through the user interface 515 to provide a specific number of retries in case a first remote connection attempt fails, request specific connection status information or otherwise configure the transparent proxy 355 connection capabilities and features.

Protocol filters 520, may also be stored on the server 305 in some embodiments to provide specific capabilities or functions in response to communications requests utilizing particular protocol(s) or ports. In accordance with the invention, for most application-level protocols, the transparent proxy 355 does not interpret or modify data transmitted between a client application and a remote server. However, for some protocols, a minimum amount of data interpretation may be necessary, and thus, a protocol filter 520 may need to be applied to provide the required interpretation.

A protocol filter 520 may be used for many other purposes such as providing destination URL restrictions, protocol restrictions, or caching, for example. A protocol filter 520 may be set up to receive incoming data streams for particular protocols, or to accept incoming connections on an open line, even if the connections are not initiated by a client application program on the LAN 310. In this manner, protocol filters 520 may be used to enable remote access to a particular LAN to perform business or household tasks, for example. Protocol filters 520 may also be used to support protocols which cannot be transparently proxied for some reason. The possibilities for protocol filter uses and capabilities are numerous.

A RAS connection control module 525 is provided on the server 305 to control connections established through the RAS dial-out stack 360, which in turn controls an external communications device 630 such as a modem or Integrated Services Digital Network (ISDN) line and associated driver.

The operation of the transparent proxy of the invention is described in more detail in reference to FIGS. 4 and 5. A communications request, such as an FTP request is issued from the external network-capable TCP/IP-compatible client application 325, for example. In accordance with the invention, the client application program 325 does not need to include proxy configuration capabilities or be configured to know about and use the transparent proxy 355, therefore the communications request is made in the native protocol of the request.

The communications request includes information identifying the computer system with which the application 325 requests communication. This identifying information may be in the form of a Uniform Resource Locator (URL) or an IP address of a server, for example. If the communications request does not expressly include the IP address of the server with which the client application 325 is requesting communication, then the IP address must be determined such that the Winsock DLLs 330 can open a socket to enable the requested communication. A DNS or other address resolution request is then issued from the client application 325 to determine the IP address associated with the communications request.

The Winsock 2.0 DLLs 330 package the address resolution request with header information such that a communications socket can be opened between the requesting application 325 and the server identified in the communications request. The DNS request is intercepted by the NSP stub 430 which adds a header to the request including the well-known port address of the transparent proxy application 355 of the invention. This is used in the event that a remote DNS server needs to be accessed. The communications request is then passed to the original NSP 435.

The NSP 435 forwards the request to the hosts file 440 to determine whether the server name and IP address are stored therein. If so, then the IP address of the server identified in the communications request is returned to the requesting application 325. If the IP address of the requested server is not stored in the hosts file 440, if a local DNS server is provided either on the server 305 or elsewhere on the LAN 310, the DNS request is forwarded to the local DNS server by the name space provider 435. The local DNS server then returns the indicated IP address if the information is available there.

If a local DNS server is not available or the requested IP address is not stored therein, the NSP stub 430 opens a socket and forwards the DNS request through the TCP/IP transport service provider 340 to the well-known private port on which the transparent proxy application 355 listens for communications requests. The request is passed by the TCP/IP transport service provider 340, through the network device driver(s) 445, through the network interface 450 and the network communications device 315 to the server 305 over the LAN 310.

Referring now to FIG. 5, the DNS request is received at the server 305 by the network communications device 320 and forwarded to the transparent proxy application 355 on the well-known private port through the network interface 505, the network device driver(s) 510, the TCP/IP transport service provider 345 and the Winsock 2.0 DLLs 350. The transparent proxy application 355 then establishes a connection over the remote network 365 to the DNS service through the RAS dial-out stack 360 and the modem or ISDN connection 530. The server 305 stores an IP address of a DNS service such that the transparent proxy 355 knows with which server to establish communications in response to a DNS request.

In the event that the DNS request fails, in other words none of the DNS services available to the client computer system 300 are able to resolve the requested host name to an IP address, an error message is returned to the client application 325 and ultimately to the user through the display device 240 (FIG. 2). Assuming the DNS request is successful, once an IP address is returned to the client application program 325 a connection request is made which includes the IP address of the server to connect to. As mentioned above, the connection request may expressly include the IP address in which case address resolution services are not required prior to establishing the requested connection.

In either case, the connection request from the client program 325 is similarly operated on by the Winsock 2.0 DLLs 330 to include header information such that a socket for communications may be opened by the client application 325. The connection request is then intercepted by the API tunneling LSP 425. The API tunneling LSP 425 checks to see if the connection request is directed to a local IP address (i.e. an address on the LAN 310). If so, the connection request is passed through and handled directly by the TCP/IP transport service provider 340. If the connection request is directed to a remote server not on the LAN 310, the API tunneling LSP 425 directs the connection request to the well-known private port on which the transparent proxy 355 listens for connection requests.

The connection request is forwarded to the transparent proxy application 355 on the well-known private port through the TCP/IP transport service provider 340 and the various network interface modules as described above in reference to DNS requests, over the LAN 310 to the server 305. In this manner, all communication from the client API tunneling LSP 425 and the NSP stub 430 arrive at the transparent proxy 355 through multiple sockets opened on the reserved well-known port.

In one embodiment, the transparent proxy application 355 checks to see if there is a protocol filter 520 associated with the native protocol of the connection request or with a port indicated in the connection request. If so, the protocol filter 520 is applied to provide specific functionality such as preventing specific communications as described above. If communications are allowed to be established, the transparent proxy application 355 then directs the RAS dial-out stack 360 to establish the requested connection. Once established, communication between the requesting client application 325 and the remote server identified in the communications request is tunneled bi-directionally through the transparent proxy 355 until the client application 325 directs the proxy to close a socket and discontinue communications.

Although the transparent proxy 355 and supporting software modules are described above using specific protocols, operating system software, communications modules and service provider modules, it will be appreciated by those of skill in the art that other protocols and software modules which are within the scope of the claims below may also be utilized in accordance with the present invention. For example, although a Windows TCP/IP environment is described herein, other operating system and network communications environments may also be utilized in accordance with the invention using different software communications layers. Further, although the LAN in the examples above is a wireless LAN, other types of local network configurations such as Ethernet and token ring wired configurations for example, are within the scope of the invention.

Additionally, it will be appreciated by those of skill in the art that the client software modules may also reside on the server computer system 305 such that an application on the server computer system 305 may request external communications. In this context, each reference to "client" above in terms of application programs and software modules refers to a client of the transparent proxy application 355 and not necessarily a separate computer system.

The transparent proxy and supporting software modules and method of the invention provide many advantages over prior art proxy applications. The transparent proxy of the invention does not require client applications to include proxy configuration capabilities or to know anything about the transparent proxy in order to use the proxy for remote communications. For this reason, new applications can readily utilize the transparent proxy of the invention even if they do not include proxy configuration capabilities.

Further, the transparent proxy of the invention processes communications requests in the native protocol of the requests. Thus, the proxy of the invention does not have to be rewritten or updated to support new protocols. Additionally, as communications requests are managed in their native protocols instead of being encapsulated in a particular protocol, significant overhead is eliminated in handling the communications requests and applications work equally well for proxied or non-proxied purposes. Also, the layered service providers of the invention are practically invisible to client applications. In this manner, communications requests directed to local PCs are not adversely affected by the presence of the LSPs which direct communications requests directed to remote servers to the transparent proxy application of the invention and which pass local communications requests through to be handled by local services.

Thus, a method and apparatus for providing remote communications including a transparent proxy is described. Whereas many alterations and modifications of the invention may occur to one of ordinary skill in the art after having read the foregoing description, it is to be understood that the particular embodiments shown and described by way of illustration are in no way intended to be considered limiting. Therefore, references to details of various embodiments are not intended to limit the scope of the claims which in themselves recite only those features regarded as essential to the invention.

We claim:

1. A computer-implemented method for communicating from a client application, the method comprising:
   intercepting a communications request from the client application in the native protocol of the communications request with a layered service provider above a transport service provider in a stack, the transport service provider to provide data transport between a client computer and another computer, the client computer including the client application and the layered service provider;
   the layered service provider determining whether the communications request requests communication with a remote server; and
   if the communications request requests communication with a remote server, the layered service provider packaging and forwarding the communications request to a transparent proxy application that receives the communications request in the native protocol, and establishes the requested communication with the remote server.

2. The computer-implemented method as set forth in claim 1 wherein the communications request is a request for connection to a remote server and the service provider is a layered applications programming interface (API) tunneling service provider.

3. The computer-implemented method as set forth in claim 1 wherein the communications request is an address resolution request and the service provider is a name space service provider stub.

4. The computer-implemented method as set forth in claim 1 wherein the client application is a browser program.

5. The computer-implemented method as set forth in claim 1 wherein the client program does not include information about the transparent proxy mode application.

6. The computer-implemented method as set forth in claim 1 further including:
   determining whether the communications request requests communication with a local computer; and
   passing the communications request through to local communications services if the communication request requests communication with the local computer.

7. An apparatus to provide communications between a client application program stored on a client computer and a remote server, the apparatus comprising:
   a layered service provider to be stored on the client computer to intercept a communications request from the client application program in a native protocol of the communications request and forward the communications request to a transparent proxy that controls communication with the remote server.

8. The apparatus as set forth in claim 7 wherein the layered service provider is further to intercept communications requests from the client application program directed to a local computer and to pass the communications request through to a local communications service coupled to the layered service provider.

9. The apparatus as set forth in claim 7 wherein the communications request is an address resolution request and the layered service provider is a name space provider.

10. The apparatus as set forth in claim 7 wherein the communications request is a request to connect to a remote server and the layered service provider is an API tunneling layered service provider.

11. The apparatus as set forth in claim 7 wherein communications between the client application program and the remote server are tunneled bidirectionally through the transparent proxy application.

12. The apparatus as set forth in claim 7 wherein the client application program is a browser program.

13. A machine readable medium having stored thereon data representing sequences of instructions, which when executed by a first computer, cause the first computer to:
   intercept a communications request from a client application in the native protocol of the communications request with a layered service provider above a transport service provider in a stack, the transport service provider to provide data transport between the first computer and a second computer, the first computer to store the client application and the layered service provider;
   the layered service provider to determine whether the communications request requests communication with a remote server; and
   if the communications request requests communication with the remote server, the layered service provider packaging and passing the communications request to a predetermined well-known port on which a transparent proxy application listens, the transparent proxy application to receive the communications request in the native protocol, and establish the requested communication with the remote server.

14. The machine readable medium as set forth in claim 13 further causing the first computer to:
   intercept a communications request from a client application using the layered service provider, the client application requesting communication with a local server; and
   pass the local communications request to a local communications service using the layered service provider.

15. The machine readable medium as set forth in claim 13 wherein the layered service provider is a layered name space provider.

16. The machine readable medium as set forth in claim 13 wherein the layered service provider is an API tunneling layered service provider.

17. A client computer comprising:
   a bus to communicate information;
   a processor coupled to the bus to execute instructions; and
   at least one memory coupled to the bus to store instructions for execution by the processor, the memory to store
      an application program,
      a transport service provider, and
      a layered service provider above the transport service provider in a stack, the layered service provider to intercept a communications request from the application program that is directed to a remote server and forward the communications request to a transparent proxy application, the transport service provider to transport data from the client computer to the remote server.

18. The client computer of claim 17 wherein the at least one memory is further to store a Winsock transmission control protocol/internet protocol stack that includes the transport service provider.

19. The client computer of claim 17 wherein the at least one memory is further to store a Windows operating system.

20. The client computer of claim 17 wherein the layered service provider is further to cause the communications request to be processed by the transparent proxy on behalf of the client application.

21. A machine readable medium having stored thereon data representing sequences of instructions, which when executed by a first computer, cause the first computer to:
   receive a communications request intercepted from a client application by a layered service provider above a transport service provider in a stack, the communications request being directed to a remote server, the transport service provider to provide data transport between the first computer and a second computer; and
   establish the requested communication with the remote server on behalf of the client application.

22. The machine readable medium of claim 21 wherein establishing the requested communication includes controlling a dial-out mechanism.

23. The machine readable medium of claim 21 wherein receiving the communications request includes receiving the communications request in the native protocol of the request.

24. The machine readable medium of claim 22 further causing the first computer to:
   determine whether there is a protocol filter corresponding to a native protocol of the communications request; and
   apply the corresponding protocol filter to the communications request in response determining whether there is a corresponding protocol filter.

25. The machine readable medium of claim 21 further causing the computer system to:
   bidirectionally tunnel communications between the client application and the remote server once the requested communication has been established.

* * * * *